(12) United States Patent
Mutter et al.

(10) Patent No.: US 12,120,010 B2
(45) Date of Patent: Oct. 15, 2024

(54) ERROR DETECTION TEST DEVICE FOR A SUBSCRIBER STATION OF A SERIAL BUS SYSTEM AND METHOD FOR TESTING MECHANISMS FOR DETECTING ERRORS IN A COMMUNICATION IN A SERIAL BUS SYSTEM

(71) Applicant: Robert Bosch GmbH, Stuttgart (DE)

(72) Inventors: Arthur Mutter, Neuhausen (DE);
Carsten Gebauer, Abstatt (DE);
Christian Horst, Dusslingen (DE);
Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 385 days.

(21) Appl. No.: 17/615,689

(22) PCT Filed: May 27, 2020

(86) PCT No.: PCT/EP2020/064666
§ 371 (c)(1),
(2) Date: Dec. 1, 2021

(87) PCT Pub. No.: WO2020/244983
PCT Pub. Date: Dec. 10, 2020

(65) Prior Publication Data
US 2022/0239576 A1    Jul. 28, 2022

(30) Foreign Application Priority Data
Jun. 3, 2019    (DE) .................... 10 2019 208 058.8

(51) Int. Cl.
*H04L 43/0823*    (2022.01)
*H04L 12/40*    (2006.01)
*H04L 43/50*    (2022.01)

(52) U.S. Cl.
CPC ...... *H04L 43/0823* (2013.01); *H04L 12/4013* (2013.01); *H04L 43/50* (2013.01); *H04L 2012/40215* (2013.01)

(58) Field of Classification Search
CPC . H04L 12/40; H04L 12/4135; H04L 12/4013; H04L 2012/4021; H04L 43/0823; H04L 43/50
See application file for complete search history.

(56) References Cited

U.S. PATENT DOCUMENTS

2003/0115543 A1* 6/2003 Emde ................ H04L 1/242
714/800
2006/0101317 A1   5/2006 Uemura et al.
(Continued)

FOREIGN PATENT DOCUMENTS

CN    106559286 A    4/2017
CN    107113209 A    8/2017
(Continued)

OTHER PUBLICATIONS

ISO 11898-1:2015 Standard, 2015, pp. 1-74.
International Search Report for PCT/EP2020/064666 Issued Aug. 10, 2020.

*Primary Examiner* — Gary Mui
(74) *Attorney, Agent, or Firm* — NORTON ROSE FULBRIGHT US LLP; Gerard A. Messina

(57) ABSTRACT

An error detection test device for a subscriber station of a serial bus system. The error detection test device has an evaluation module for evaluating which bit of a signal must be interrupted so that the receivers of the resulting signal in which the at least one bit is interrupted can check the function of an error detection mechanism, the signal being processed by a protocol control unit while the subscriber station is in operation in order to be able to be transmitted as a frame onto a bus of the bus system or, after a frame has (Continued)

been received from the bus, to decode the signal from the frame, and an output terminal for outputting a switching signal to the protocol control unit to interrupt the at least one bit. The evaluation module generates the switching signal based on the at least one bit evaluated by the evaluation module.

15 Claims, 5 Drawing Sheets

(56) References Cited

U.S. PATENT DOCUMENTS

| | | | |
|---|---|---|---|
| 2017/0235630 A1* | 8/2017 | Hartwich | G06F 11/1004 |
| | | | 714/807 |
| 2021/0377071 A1* | 12/2021 | Mutter | H04L 12/4604 |
| 2022/0052875 A1* | 2/2022 | Hartwich | H04L 12/40013 |
| 2022/0066968 A1* | 3/2022 | Mutter | G06F 13/376 |
| 2022/0209983 A1* | 6/2022 | Mutter | H04L 12/40013 |
| 2022/0239527 A1* | 7/2022 | Hartwich | H04L 12/40 |

FOREIGN PATENT DOCUMENTS

| | | |
|---|---|---|
| CN | 107959599 A | 4/2018 |
| CN | 109743228 A | 5/2019 |
| DE | 102004002771 A1 | 8/2005 |
| DE | 102012110712 A1 | 4/2014 |
| EP | 2978168 A1 | 1/2016 |
| JP | 2008312010 A | 12/2008 |

* cited by examiner

ERROR DETECTION TEST DEVICE FOR A SUBSCRIBER STATION OF A SERIAL BUS SYSTEM AND METHOD FOR TESTING MECHANISMS FOR DETECTING ERRORS IN A COMMUNICATION IN A SERIAL BUS SYSTEM

FIELD

The present invention relates to an error detection test device for a subscriber station of a serial bus system and to a method for testing mechanisms for detecting errors in a communication in a serial bus system by which the function of mechanisms defined in the communications protocol for detecting errors is able to be tested during an ongoing operation.

BACKGROUND INFORMATION

For a communication between sensors and control units, e.g., in vehicles or industrial plants, a bus system may be used in which data are transmitted as messages in the ISO 11898-1:2015 standard as a CAN protocol specification using CAN FD rather than a point-to-point connection for cost-related reasons. The messages are transmitted between the subscriber stations of the bus system, e.g., a sensor, control unit, actuator, and others. At present, in the introductory phase, CAN FD is mostly used at a data bit rate of 2 Mbit/s in the transmission of bits of the data field in a first step and at an arbitration bit rate of 500 kbit/s in the transmission of bits of the arbitration field in the vehicle.

Ever more information is exchanged using such a bus system. In addition to the pure data transport, however, other functions are also to be supported such as safety (functional safety), security (data security), and QoS (Quality of Service, e.g., a guarantee of a maximum latency for a frame, time synchronization of the subscriber stations (nodes) in the bus system). Users also desire a further increase in the data rate in the bus system in order at least to retain the speed of the data transmission in the bus system and, ideally, to increase it further.

The speed of the data transmission in the bus system is also affected by the correct functioning of the data transmission in the bus system. Mechanisms for an error detection are provided for that purpose. If errors occur, a currently transmitted frame is aborted and then transmitted again. This causes multiple transmissions of data, which in turn lowers the speed of the data transmission.

In addition, there is the problem that when examining the system safety of the bus system, only the particular mechanisms for an error detection that are also testable in the system are taken into account. For example, a digital circuit that checks the check sum (CRC) of a received frame could develop a defect and then accept all check sums (CRCs) as valid. Such a defect may be a hardware defect or be caused by signal interference due to irradiation. A defect of this kind is therefore not easily detectable.

SUMMARY

It is an object of the present invention to provide an error detection test device for a subscriber station of a serial bus system and a method for testing mechanisms for detecting errors in a communication in a serial bus system which solve the aforementioned problems. More particularly, an error detection test device for a subscriber station of a serial bus system and a method for testing mechanisms for an error detection in a communication in a serial bus system are to be provided in which an increase in the useful data quantity per frame is able to be realized with compatibility with earlier communications versions of the subscriber station and high system security in comparison with earlier communications versions of the subscriber station.

This object may achieved by an error detection test device for a subscriber station of a serial bus system in accordance with the present invention. In accordance with an example embodiment of the present invention, the error detection test device has an evaluation module for evaluating which bit in a signal must be interrupted so that the receivers of the resulting signal in which the at least one bit is interrupted are able to check the function of a predefined error detection mechanism, the signal being processed by a protocol control unit while the subscriber station is in operation in order to be transmitted as a frame onto a bus of the bus system or in order to decode the signal from the frame after a frame has been received from the bus, and it has an output terminal for outputting a switching signal to the protocol control unit in order to interrupt the at least one bit evaluated by the evaluation module with regard to the signal output by the protocol control unit, the evaluation module being developed to generate the switching signal on the basis of the at least one bit evaluated by the evaluation module.

The error detection test device makes it possible for the subscriber station as a transmitter and/or receiver of a frame, which particularly may be a CAN frame or some other serially transmitted frame, to falsify a correct frame by a selective insertion of bit errors. In this context, the error detection testing device can falsify the frame in such a way that, depending on the position of the bit error, the receiver of the frame detects a predefined error, in particular a check sum error (CRC error) or a format error of the frame or a stuff error. A stuff error has occurred when a stuffing rule that was used when the frame was generated has been violated. In CAN FD, for instance, a dynamic bit stuffing rule applies up to the beginning of the CRC field, according to which an inverse bit has to be inserted after 5 identical bits. In addition, starting with the beginning of the CRC field, there is a fixed stuffing rule in CAN FD that requires the insertion of a fixed stuff bit after a fixed number of bits. Alternatively, instead of only one stuff bit, two or more bits may be inserted as fixed stuff bits. The mentioned bit stuffing rules are of course modifiable in a CAN FD successor version or other bit stuffing rules may be applied.

If the receivers of the frame falsified by the error detection test device have detected the error, the receivers may report the error using the pertinent possibilities available for this purpose, in particular the transmission of an error frame.

Thus, the correct function of the mechanisms defined in the protocol for an error detection is able to be verified in the finished system with the aid of the error detection test device. These mechanisms may thus be taken into account when the system security is examined.

As a result, even when increasing the data rate, the transmitting and receiving of the frames with great flexibility with regard to the new additional functions of the bus system and a low error rate and verifiable mechanisms for an error detection is thus able to be ensured with the aid of the subscriber station.

More particularly, the use of the subscriber station in the bus system makes it possible to retain an arbitration from CAN in a first communications phase while still increasing the transmission rate even further in comparison with CAN or CAN FD.

The method carried out by the subscriber station may also be used when the bus system has at least one CAN subscriber station and/or at least one CAN FD subscriber station which transmit(s) messages according to the CAN protocol and/or the CAN FD protocol.

Advantageous further embodiments of the error detection test device are disclosed herein.

In accordance with an example embodiment of the present invention, it is possible that the error detection test device furthermore has a control module for switching on the error detection test device shortly before the start of the signal or for switching off the error detection test device at the end of the signal.

The evaluation module and/or the control module is/are possibly developed to also evaluate an identifier of the frame and/or a control bit with regard to the frame to be transmitted in order to determine whether or not the error detection test device is to be switched on shortly before the start of the signal.

The evaluation module and/or the control module may possibly be developed to also evaluate a control bit in the memory for the frame to be transmitted in order to determine whether or not the error detection test device is to be switched on shortly before the start of the signal.

Moreover, the error detection test device may have at least one counter for counting bits of the signal, at least one configuration register for specifying a predefined counter value for the counter after the error detection test device has been switched on, at least one input terminal for receiving information in connection with the signal from the protocol control unit, and at least one output terminal for signaling with the aid of the switching signal when at least a part of a bit in the signal is to be interrupted, the interruption of the signal corresponding to a check sum error and/or a stuff error and/or a format error. In this context, the at least one counter may be developed to count every bit of the signal on the basis of the information received at the at least one input terminal and to output at the at least one output terminal the switching signal on the basis of the counter value predefined by the at least one configuration register.

It is possible that the at least one counter is developed to count every bit of the signal on the basis of the information received at the at least one input terminal and to output the switching signal at the output terminal when the counter value predefined by the configuration register has been reached.

It is furthermore possible that the signal is a transmit signal that is to be transmitted in a frame onto the bus or that the signal is a receive signal that is to be received in a frame from the bus, or that the signal was generated for an inter frame space between frames on the bus.

Optionally, for a frame that is exchanged between subscriber stations of the bus system, the bit time of a signal transmitted onto the bus in the first communications phase differs from a bit time of a signal transmitted in the second communications phase.

The evaluation module may be developed to generate the switching signal in such a way that the bit of the signal is inverted.

According to one exemplary embodiment of the present invention, the evaluation module is developed to generate the switching signal in such a way that at least one time quantum of the bit of the signal is inverted, the bit being subdivided into at least two time quanta and the error detection test device being developed so that it is configurable into how many time quanta the bit is subdivided.

The frame may be set up to be compatible with CAN FD.

In accordance with an example embodiment of the present invention, at least one of the above-described error detection test devices may be part of a subscriber station for a serial bus system. The subscriber station furthermore has a communications control device for controlling a communication of the subscriber station with at least one other subscriber station of the bus system, and the communications control device has the protocol control unit, which is developed to process the signal while the subscriber station is in operation in order to be transmitted as a frame onto a bus of the bus system or, after a frame has been received from the bus, to decode the signal from the frame, and a transceiver device for transmitting a transmit signal generated by the communications control device as a frame onto the bus and/or for receiving a frame from the bus.

Moreover, the subscriber station may have a logic module for inputting the signal processed by the protocol control unit and the switching signal, and for outputting the interrupted signal, the switching signal being active only for the part of the bit that is to be interrupted, and the transceiver device being developed to store the signal interrupted by the at least one error detection test device in order to evaluate the interrupted signal.

In accordance with an example embodiment of the present invention, the above-described subscriber station may be part of a bus system that furthermore includes a bus and at least two subscriber stations, which are connected to one another via the bus in such a way that they are able to serially communicate with one another. At least one of the at least two subscriber stations is an above-described subscriber station.

The above-mentioned object may also be achieved by a method for testing mechanisms for an error detection in a communication in a serial bus system in accordance with an example embodiment of the present invention. In accordance with an example embodiment of the present invention, the method is executed by an error detection test device for a subscriber station of the bus system, and the method has the steps of evaluating, using an evaluation module of the error detection test device, which bit in a signal must be interrupted so that the receivers of the resulting signal in which the at least one bit is interrupted are able to check the function of a predefined error detection mechanism, the signal being processed by a protocol control unit of the subscriber station while the subscriber station is in operation in order to be transmitted as a frame onto a bus of the bus system or, after a frame has been received from the bus, to decode the signal from the frame, and outputting, using an output terminal, a switching signal to the protocol control unit in order to interrupt the at least one bit, evaluated by the evaluation module, in the signal output by the protocol control unit, the evaluation module generating the switching signal on the basis of the at least one bit evaluated by the evaluation module.

The present method offers the same advantages as those mentioned above with regard to the error detection test device.

Further possible implementations of the present invention also include not explicitly mentioned combinations of features or embodiments described in the above or following text in connection with the exemplary embodiments. One skilled in the art will also add individual aspects as improvements or supplements to the respective basic form of the present invention, in view of the disclosure herein.

BRIEF DESCRIPTION OF THE DRAWINGS

In the following text, the present invention will be described in greater detail with reference to the figures and on the basis of exemplary embodiments.

Unless indicated otherwise, identical or functionally equivalent elements in the figures have been provided with the same reference numerals.

DETAILED DESCRIPTION OF EXAMPLE EMBODIMENTS

Figure 1:
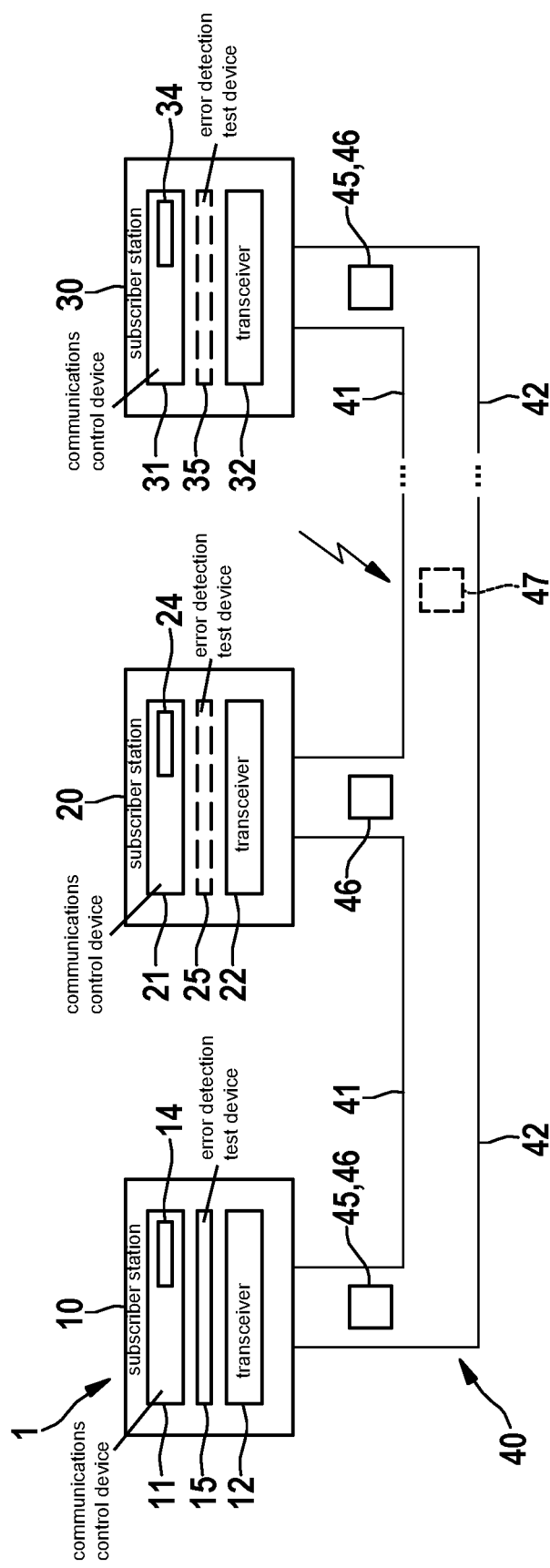
FIG. 1 shows a simplified circuit diagram of a bus system according to a first exemplary embodiment of the present invention.

As an example, FIG. 1 shows a bus system 1, which is a serial bus system in which data are serially transmitted. In particular, bus system 1 may basically be configured for a CAN bus system, a CAN FD bus system, a CAN FD successor bus system, which hereinafter will be referred to as a CAN FX bus system, and/or variations thereof, as described in the following text by way of an example. Bus system 1 may be used in a vehicle, in particular a motor vehicle, an airplane, etc., or in a hospital or an industrial plant, and others.

In FIG. 1, bus system 1 has a multitude of subscriber stations 10, 20, 30, which are connected to a bus 40 by a first bus conductor 41 and a second bus conductor 42 in each case. In a CAN-based bus system, bus conductors 41, 42 may also be referred to as CAN_H and CAN_L or CAN-FX_H and CAN-FX_L and are used for an electrical signal transmission after coupling of the dominant levels or the generation of recessive levels for a signal in the transmitting state. Messages 45, 46 in the form of signals are serially transmittable between individual subscriber stations 10, 20, 30 via bus 40. If an error occurs in the communication on bus 40, as illustrated by the jagged black arrow in FIG. 1, then an error frame 47 (error flag) can optionally be transmitted. Error frame 47 may optionally be developed so that error frame 47 indicates the type of detected error. Subscriber stations 10, 20, 30, for example, are control units, sensors, display devices, etc. of a motor vehicle.

As illustrated in FIG. 1, subscriber station 10 has a communications control device 11, a transceiver 12, and a communications error detection module 14 and an error detection test device 15. Subscriber station 20 has a communications control device 21, a transceiver 22, and a communications error detection module 14. Optionally, subscriber station 20 furthermore has an error detection test device 15. Subscriber station 30 has a communications control device 31, a transceiver 32, and a communications error detection module 34. Optionally, subscriber station 30 furthermore has an error detection test device 35. Transceivers 12, 22, 32 of subscriber stations 10, 20, 30 are directly connected to bus 40 in each case, even if this is not illustrated in FIG. 1.

Communications control devices 11, 21, 31 are used for the control of a communication of respective subscriber station 10, 20, 30 via bus 40 with at least one other subscriber station of subscriber stations 10, 20, 30 connected to bus 40.

Communications control devices 11, 31 prepare and read first messages 45, which are modified CAN messages 45, for example. Modified CAN messages 45 are formed on the basis of a CAN FD successor format, which is also referred to as a CAN FX format and will be described in greater detail with reference to FIG. 2. Communications control devices 11, 31 may furthermore be developed to supply a CAN FX message 45 or a CAN FD message 46 for transceivers 12, 32, as the case may be, or to receive such messages from there. Modules 14, 34 and devices 15, 35 are used in this context, as will be described in greater detail in the following text. Communications control devices 11, 31 thus prepare and read a first message 45 or a second message 46, first and second messages 45, 46 differing by their data transmission standard, that is to say, CAN FX or CAN FD in this case.

With the aid of the two subscriber stations 10, 30, it is therefore possible to create and then transmit messages 45 using the CAN FX format and to receive such messages 45.

Communications control device 21 may be developed like a conventional CAN controller according to ISO 11898-1: 2015, that is to say, like a CAN FD-tolerant classic CAN controller or a CAN FD controller. Communications device 21 prepares and reads second messages 46, e.g., CAN FD messages 46. CAN FD messages 46 may include between 0 and 64 data bytes, which are furthermore transmitted at a considerably faster data rate than in a classic CAN message. Communications control device 21 is particularly developed like a conventional CAN FD controller.

Transceiver 22 may be developed like a conventional CAN transceiver according to ISO 11898-1:2015 or a CAN FD transceiver. Transceivers 12, 32 can be developed to supply messages 45 according to the CAN FX format or messages 46 according to the current CAN FD format or messages 46 according to the current CAN FD format, as the case may be, for associated communications control device 11, 31 or to receive such messages from there.

Modules 14, 24, 34 may have an identical structure in terms of their function. Devices 15, 25, 35 may have an identical structure in terms of their function.

Figure 2:
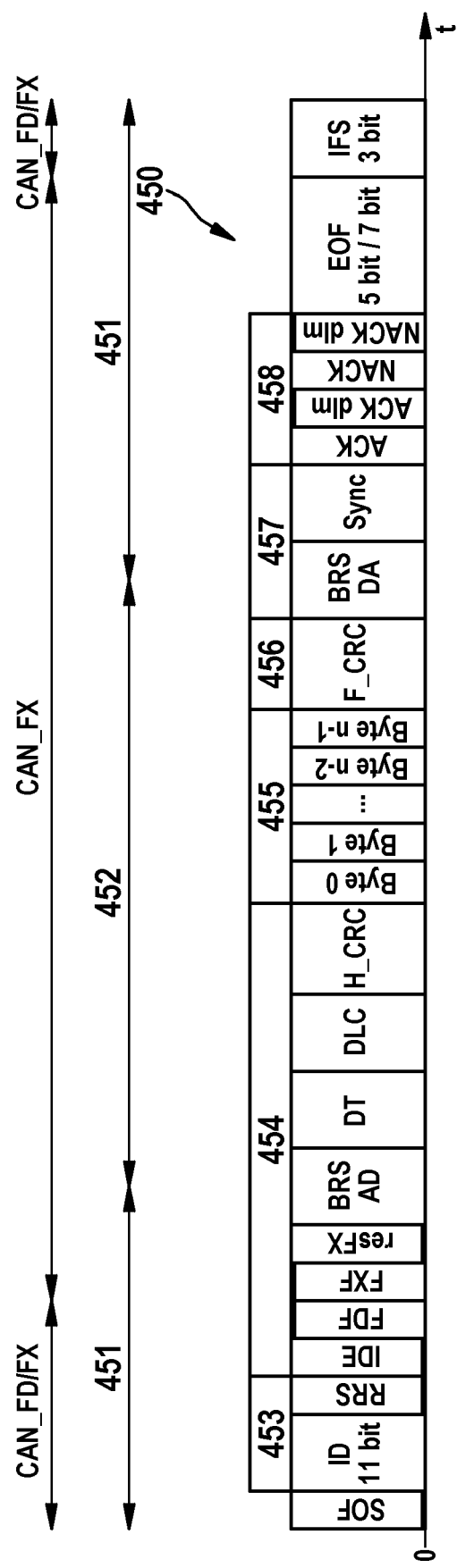
FIG. 2 shows a circuit diagram to illustrate the structure of a message that may be transmitted by a subscriber station of the bus system according to the first exemplary embodiment of the present invention.

For message 45, FIG. 2 shows a CAN FX frame 450 as it is supplied by communications control device 11 for transceiver 12 for a transmission onto bus 40. In the present exemplary embodiment, communications control device 11 sets up frame 450 as compatible with CAN FD, as also illustrated in FIG. 2. The same analogously applies to communications control device 31 and transceiver 32 of subscriber station 30.

According to FIG. 2, CAN FX frame 450 is subdivided into different communications phases 451, 452 for the CAN communication on bus 40, i.e., an arbitration phase 451 and a data phase 452. Frame 450 has an arbitration field 453, a control field 454, a data field 455, a check sum field 456 for a check sum F_CRC, a synchronization field 457, and a confirmation field 458.

In arbitration phase 451, a negotiation for frame 450 takes place among subscriber stations 10, 20, 30 in arbitration field 453 in a bitwise manner with the aid of the identifier (ID) which, for instance, has 11 bits, as to which subscriber station 10, 20, 30 wants to transmit message 45, 46 at the highest priority and thus receives the next exclusive access to bus 40 of bus system 1 for a transmission in subsequent data phase 452.

By their identifier (ID), frames 450 arbitrate in a left-aligned manner with respect to other frames 450 or with respect to CAN FD frames for the next exclusive, collision-free access to bus 40. The identifier (ID) is followed by an RRS bit.

The following IDE bit is transmitted as dominant because an IDE bit transmitted as recessive in the CAN FD format switches over to a 29-bit identifier.

In frame 450 it is the case that bits that are shown with a thick bar at their bottom line in FIG. 2 are transmitted as dominant in frame 450. It furthermore applies to frame 450 that bits that are shown with a thick bar at their upper line in FIG. 2 are transmitted as recessive in frame 450.

In arbitration phase 451 of frame 450, a physical layer like in CAN and CAN FD is used. The physical layer corresponds to the bit transmission layer or layer 1 of the conventional OSI model (Open Systems Interconnection) model.

An important point during phase 451 is that the conventional CSMA/CR method is used, which allows for simultaneous access of subscriber stations 10, 20, 30 to bus 40 without destroying higher-prioritized message 45, 46. This makes it relatively easy to add further bus subscriber stations 10, 20, 30 to bus system 1, which is very advantageous.

The CSMA/CR method means that what is known as recessive states must exist on bus 40, which other subscriber stations 10, 20, 30 are able to overwrite with dominant states on bus 40. In the recessive state, high-impedance conditions prevail at the individual subscriber station 10, 20, 30, which in combination with the parasites of the bus circuitry result in longer time constants. This leads to a restriction of the maximum bit rate of the current CAN FD physical layer to approximately 2 megabits per second at present in a real vehicle application.

In data phase 452, in addition to a portion of control field 454, the useful data of the CAN FX frame or of message 45 from data field 455 are transmitted and also check sum field 456 for check sum F_CRC.

A transmitter of message 45 begins a transmission of bits of data phase 452 on bus 40 only when subscriber station 10 as the transmitter has won the arbitration and subscriber station 10 as the transmitter thus has exclusive access to bus 40 of bus system 1 for the transmission.

Quite generally, compared to CAN or CAN FD, the following deviating characteristics are able to be realized in the bus system using CAN FX:
   a) adopting and possibly adapting proved and tested characteristics that are responsible for the robustness and user ease of CAN and CAN FD, in particular the frame structure with identifier and arbitration according to the CSMA/CR method,
   b) increasing the net data transmission rate, in particular to approximately 10 megabits per second,
   c) increasing the size of the useful data per frame, in particular to approximately 4 Kbytes.

As illustrated in FIG. 2, subscriber station 10 partially, in particular up to and including the FDF bit, uses a format according to ISO 11898-1:2015 from CAN/CAN FD, to set up frame 450 in arbitration phase 451 as the first communications phase. From the SOF bit and up to and including the FDF bit, frame 450 is therefore identical with the CAN FD base frame format according to ISO 11898-1:2015. For that reason, the conventional structure will not be addressed further here.

In contrast, starting from the FDF bit, subscriber station 10 uses a CAN FX format, which is described in the following text, in the first communications phase and the second communications phase, i.e., data phase 452.

In frame 450, the FXF bit which, as mentioned above, corresponds to the "res bit" in the CAN FD base frame format in terms of its position, directly follows the FDF bit. If the FXF bit is transmitted as a 1, i.e., as recessive, it thereby identifies frame 450 as a CAN FX frame. For a CAN FD frame, communications control device 11 sets the FXF bit as a 0, i.e., as dominant.

Thus, the res bit from CAN FD, which is referred to as the FXF bit in the following text, is used for the switchover from the CAN FD format to the CAN FX format. The frame formats of CAN FD and CAN FX are therefore identical up to the res bit. A CAN FX subscriber station, that is to say, subscriber stations 10, 30 here, also supports CAN FD.

In general, two different stuffing rules are applied when frame 450 is generated. Up to the FXF bit in control field 454, the dynamic bit stuffing rule of CAN FD applies so that an inverse stuff bit has to be inserted after five identical bits in sequence. After an FX bit in control field 454, a fixed stuffing rule applies so that a fixed stuff bit has to be inserted after a fixed number of bits. Alternatively, two or more bits instead of only one stuff bit may be inserted as fixed stuff bits.

A resFX bit, which is a dominant bit for future use, follows the FXF bit in frame 450. The resFX bit must be transmitted as a 0, i.e., as dominant, for frame 450. However, if subscriber station 10 receives a resFX bit as a 1, i.e., as recessive, receiving subscriber station 10 goes into a protocol exception state, for instance, in the way it occurs in a CAN FD message 46 for a res=1. The resFX bit could also be defined precisely in reverse so that it has to be transmitted as a 1, i.e., as recessive, so that the receiving subscriber station goes into the protocol exception state with a dominant resFX bit. In the protocol exception state, the CAN FD controller, which is communications control device 21 in the present example, is set into an operating state in which the CAN FD controller does not influence CAN bus 40.

After the resFXF bit, a sequence BRS AD in which a predefined bit sequence is encoded follows in frame 450. This bit sequence allows for a simple and secure switchover from the arbitration bit rate of arbitration phase 451 to the data bit rate of data phase 452. For example, the bit sequence of the BRS AD is made up of a recessive arbitration bit followed by a dominant data bit. In this example, the bit rate may be switched over at the edge between the two mentioned bits.

After the sequence BRS AD, a DT field follows in frame 450 in which the data type (Data Type=DT) of the useful data of data field 455 is indicated, which will be described in greater detail in the following text. The DT field has a length of 1 byte, for example, which allows for the definition of $2^8$=256 different data types. It is of course possible to select a different length for the DT field. The data type characterizes the content of data field 455 with regard to the type of information that is included in data field 455.

Depending on the value in the DT field, additional headers or trailers are also transmitted in data field 455, which are provided in addition to the actual useful data (user data). As an alternative, the DT field is placed at the start of data field 455, i.e., in the first byte of data field 455, for instance. With the aid of the DT field, supplementary functions are able to be realized such as safety (functional safety), security (functional security), security (data security) and QoS (quality of service, e.g., the guarantee of a maximum latency for a frame, time synchronization of the subscriber stations (nodes) in the bus system, etc.). This makes the communications protocol modular and therefore easily expandable in the future so that additional functions can be inserted, that is, without the need to change the frame format. New supplementary functions are able to be added to old implementations with the aid of software so that the various implementations remain compatible. The communications protocol used for the bus system thus becomes expandable in a very flexible manner as well.

Following the DT field in frame 450 is a DLC field in which the data length code is inserted, which indicates the number of bytes in data field 455 of frame 450. The data length code (DLC) may assume any value from 1 up to the maximum length of data field 455 or the data field length. If the maximum data field length amounts to 2048 bits, in particular, then the data length code (DLC) requires a number of 11 bits under the assumption that DLC=0 means a data field length having 1 byte and DLC=2047 means a data field length having a number of 2048 bytes. Alternatively, a data field 455 having the length 0 may be permitted such as in CAN, for instance. Here, DLC=0 would encode the data field length having the number of 0 bytes, for example. The maximum encodable data field length with 11 bits, for instance, then is $(2^{\wedge}11)-1=2047$.

After the DLC field, a header check sum H_CRC follows the DLC data field in frame 450. The header check sum is a check sum for protecting the header of frame 450, that is to say, all bits from the beginning of frame 450 by the SOF bit to the beginning of the header check sum H_CRC, including all dynamic and optionally the fixed stuff bits up to the beginning of header check sum H_CRC. The length of header check sum H_CRC, and thus the check sum polynomial according to the cyclical redundancy check (CRC), is to be selected according to the desired Hamming distance. The data word to be protected by the header check sum H_CRC in a data length code (DLC) of 11 bits is longer than 27 bits. The polynomial of the header check sum H_CRC must therefore be at least 13 bits long to achieve a Hamming distance of 6. The calculation of header check sum H_CRC is going to be described in greater detail in the following text.

Header check sum H_CRC in frame 450 is followed by data field 455. Data field 455 is made up of 1 to n data bytes, n, for example, being 2048 bytes or 4096 bytes or any other value. A data field length of 0 is possible as an alternative. The length of data field 455 is encoded in the DLC field, as described above. The DT field, as described earlier, is optionally situated at the beginning of data field 455, i.e., in the first byte of data field 455, for instance.

Data field 455 in frame 450 is followed by a frame check sum F_CRC. Frame check sum F_CRC is made up of the bits of frame check sum F_CRC. The length of frame check sum F_CRC and thus of the CRC polynomial is to be selected according to the desired Hamming distance. Frame check sum F_CRC protects the entire frame 450. As an alternative, only data field 455 is optionally protected by frame check sum F_CRC.

Frame check sum F_CRC is followed by a sequence BRS DA in frame 450, in which a predefined bit sequence is encoded. This bit sequence allows for a simple and secure switchover from the data bit rate of data phase 452 to the arbitration bit rate of arbitration phase 451. The bit sequence of the BRS DA, for instance, is made up of a recessive data bit followed by a dominant arbitration bit. In this example, the bit rate is able to be switched at the edge between the two mentioned bits.

Sequence BRS DA in frame 450 is followed by a sync field in which a synchronization pattern (sync pattern) is stored. The synchronization pattern is a bit pattern that allows a receiving subscriber station 10, 30 to detect the beginning of arbitration phase 451 after data phase 452. The synchronization pattern enables receiving subscriber stations 10, 30 that have no knowledge of the correct length of data field 455, for instance on account of an incorrect header check sum H_CRC, to mutually synchronize. These subscriber stations can subsequently transmit a "negative acknowledge" to make the incorrect reception known. This is of particular importance when CAN FX no longer allows any error frames 47 (error flags) in data field 455.

Following the sync field in frame 450 is an acknowledgement field (ACK field), which is made up of a plurality of bits, i.e., an ACK bit, an ACK-dlm bit, a NACK bit, and a NACK-dim bit in the example of FIG. 2. The NACK bit and the NACK-dlm bit are optional bits. Receiving subscriber stations 10, 30 transmit the ACK bit as dominant if they have correctly received a frame 450. The transmitting subscriber station transmits the ACK bit as recessive. For that reason, the bit originally sent onto bus 40 in frame 450 is able to be overwritten by receiving subscriber stations 10, 30. The ACK-dlm bit is transmitted as a recessive bit and used for the separation from other fields. The NACK bit and the NACK-dlm bit are used to enable a receiving subscriber station to signal an incorrect receipt of frame 450 on bus 40. The function of the bits is like that of the ACK bit and the ACK-dlm bit.

After the acknowledgement field (ACK field), an end field (EOF=end of frame) follows in frame 450. The bit sequence of the end of frame (EOF) serves the purpose of identifying the end of frame 450. The end of frame (EOF) ensures that 8 recessive bits are transmitted at the end of frame 450. This is a bit sequence that cannot occur within frame 450 and thus makes it possible for subscriber stations 10, 20, 30 to reliably detect the end of frame 450.

The end of frame (EOF) has a length that differs depending on whether a dominant bit or a recessive bit was seen in the NACK bit. If the transmitting subscriber station has received the NACK bit as dominant, then the end field (EOF) has 7 recessive bits. In the other case, the end of field (EOF) has a length of only 5 recessive bits.

Following the end of frame (EOF) in or after frame 450 is an inter frame space (IFS). This inter frame space (IFS) is developed like in CAN FD according to the ISO11898-1: 2015. The inter frame space (IFS) amounts to maximally 3 bits.

FIG. 2 indicates a special example for the order of the subdivisions of the header for frame 450. Alternatively, the order of the subdivisions of the header may be sorted in some other way. For instance, the DLC field may be placed ahead of the DT field.

Figure 3:
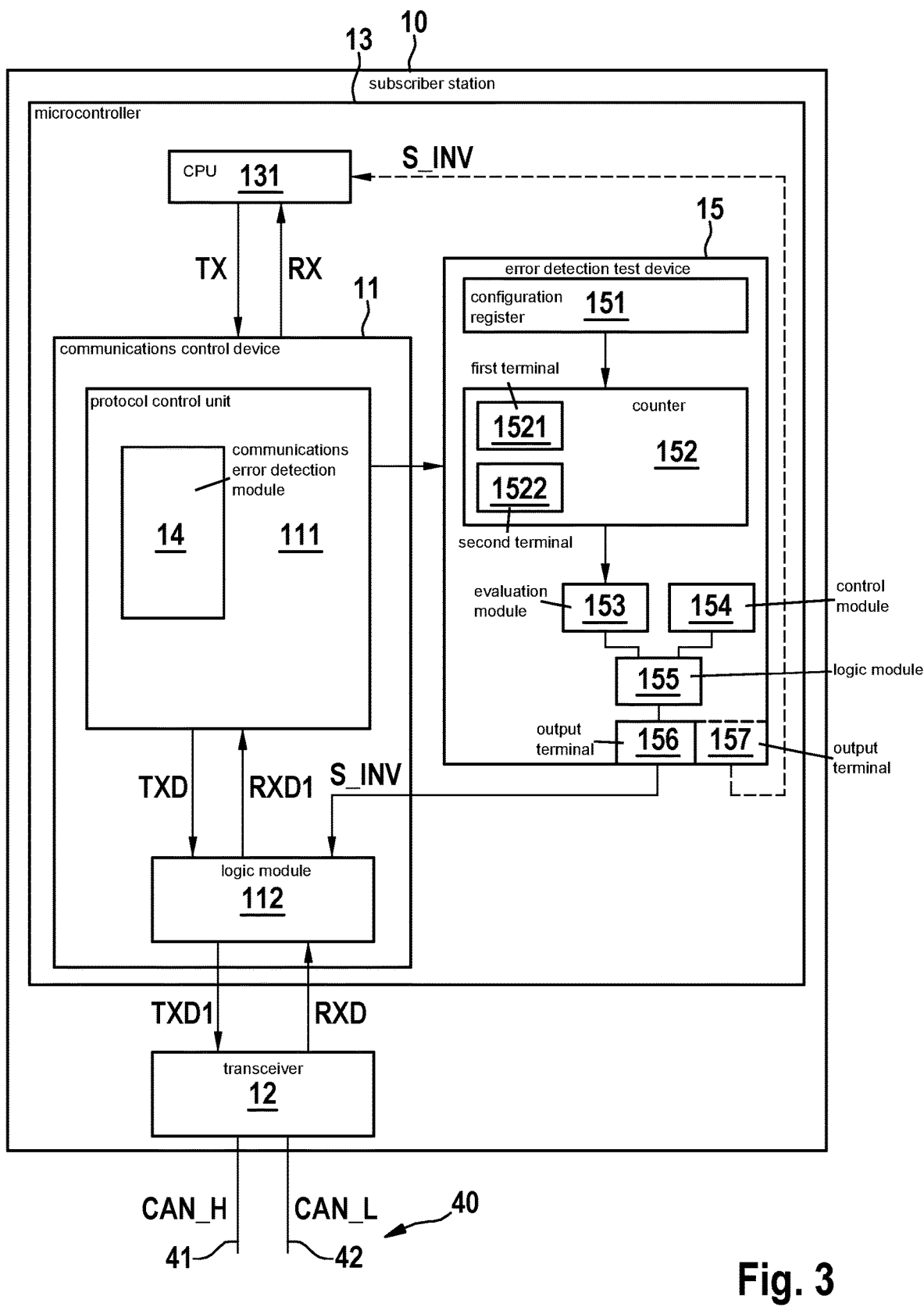
FIG. 3 shows a simplified schematic circuit diagram of a subscriber station of the bus system according to the first exemplary embodiment of the present invention.

FIG. 3 shows the basic structure of a subscriber station 10 having communications control device 11, transceiver 12, a microcontroller 13, communications error detection module 14, and error detection test device 15. Communications error detection module 14 is part of communications control device 11, more precisely, its protocol control unit 111, which may also be called a protocol controller. Communications control device 11 and error detection test device 15 are part of microcontroller 13.

Subscriber stations 20, 30 have a similar development to that shown in FIG. 3, but error detection test devices 25, 35 according to FIG. 1 are provided only as an option. Optionally, it is possible, as an alternative or in addition, for communications error detection module 14 to be disposed separately from communications control device 31 and transceiver 32. The same applies to subscriber station 20. For that reason, subscriber stations 20, 30 are not described separately.

According to FIG. 3, communications control device 11 is assigned to microcontroller 13. Microcontroller 13 has a central processing unit (CPU) 131. In addition, an energy supply device, which is not shown and supplies transceiver 12 with electrical energy, is usually installed in microcontroller 13. The energy supply device normally delivers a voltage CAN_Supply of 5V.

Depending on the requirements, however, the energy supply device may supply another voltage of a different value. In addition or as an alternative, the energy supply device may be developed as a current source. At least one memory, which central processing unit 131 normally uses while processing data, is usually provided in addition.

Communications control device 11 is responsible for implementing the CAN FX functions that were described above with reference to frame 450 of FIG. 2. In addition, communications control device 11 may realize the implementation of the CAN FD functions, as described above. Apart from protocol control unit 111, communications control device 11 includes a logic module 112.

Transceiver 12 shown in FIG. 3 has a transmitter module and a receiver module (not shown). Although the following text always refers to transceiver 12, there is the alternative of providing the receiver module in a separate device externally from the transmitter module. The transmitter module and the receiver module may be developed like in a conventional transceiver 22.

Transceiver 12 is connected to bus 40, or more precisely, its first bus conductor 41 for CAN_H or CAN FX_H and its second bus conductor 42 for CAN_L or CAN-FX_L.

While bus system 1 is in operation, the transmitter module of transceiver 12 implements a transmit signal TXD or TXD1 of communications control device 11 into corresponding signals CAN_H and CAN_L or CAN-FX_H and CAN-FX_L for bus conductors 41, 42 and transmits these signals CAN_H and CAN_L or CAN-FX_H and CAN-FX_L onto bus 40 at the terminals for CAN_H and CAN_L. Transceiver 12 implements layer 1 of the conventional OSI model, which means that transceiver 12 physically encodes the individual bits to be transmitted on bus 40, e.g., as a differential voltage VDIFF=CAN_H−CAN_L or VDIFF=CAN-FX_H−CAN-FX_L.

The receiver of transceiver 12 forms a receive signal RXD from the CAN signals received from bus 40 and forwards it to communications control device 11. With the exception of an idle or standby state, in a normal operation, transceiver 12 with the receiver always listens for a transmission of data or messages 45, 46 on bus 40, regardless of whether subscriber station 10 or its transceiver 12 is a transmitter of message 45.

Figure 4:
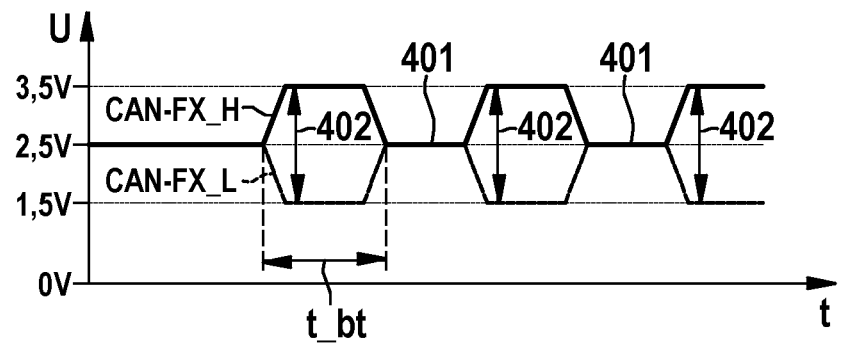
FIG. 4 shows a time characteristic of bus signals CAN_H and CAN_L that may be bus signals CAN-FX_H and CAN-FX_L in the subscriber station according to the first exemplary embodiment of the present invention.
Figure 5:
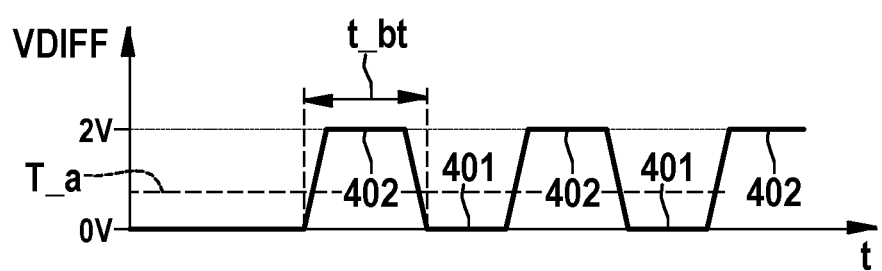
FIG. 5 shows a time characteristic of a differential voltage VDIFF of bus signals CAN-FX_H and CAN-FX_L in the subscriber station according to the first exemplary embodiment of the present invention.

According to the example of FIG. 4, the signals CAN-FX_H and CAN-FX_L have the dominant and recessive bus levels 401, 402, as from CAN, at least in arbitration phase 451. A differential signal VDIFF=CAN-FX_H−CAN-FX_L is formed on bus 40, which is illustrated in FIG. 5. The individual bits of signal VDIFF with bit time t_bt are able to be detected using a receive threshold T_a of 0.7V. In data phase 452, the bits of the signals CAN-FX_H and CAN-FX_L are transmitted faster, i.e., at a shorter bit time t_bt, than in arbitration phase 451. In data phase 452, the signals CAN-FX_H and CAN-FX_L thus differ from the conventional signals CAN_H and CAN_L at least by their higher bit rate. Bit time t_bt of bits of transmit signal TXD or TXD1 corresponds to the respective bits for arbitration phase 451 and the bits for data phase 452.

The sequence of states 401, 402 for the signals CAN-FX_H, CAN-FX_L in FIG. 4 and the characteristic of voltage VDIFF of FIG. 5 resulting therefrom simply serves to illustrate the function of subscriber station 10 for the transmission of a frame 450. The sequence of the data states for bus states 401, 402 is selectable as desired.

In other words, in a first operating mode according to FIG. 4, the transmitter module of transceiver 12 generates a first data state as bus state 402 with different bus levels for the two bus conductors 41, 42 of the bus line, and a second data state as bus state 401 with the same bus level for the two bus conductors 41, 42 of the bus line of bus 40.

In addition, in a second operating mode, which includes data phase 452, the transmitter module of transceiver 12 transmits the bits for the time characteristics of the signals CAN-FX_H, CAN-FX_L onto bus 40 at a higher bit rate. The CAN-FX_H and CAN-FX_L signals may furthermore be generated by a different physical layer than in CAN FD in data phase 452. This makes it possible to increase the bit rate in data phase 452 even further than in CAN FD.

During the operation of subscriber station 10, protocol control unit 111 receives a transmit message TX from microcontroller 13, more precisely, its central processing unit 131, when subscriber station 10 wants to send data onto bus 40. Transmit message TX includes data that are to be transmitted via bus 40, in particular in a frame 450 or a frame for CAN FD, to another subscriber station 10, 20, 30 of bus system 1. In addition, protocol control unit 111 transmits a receive message RX to microcontroller 13 when transceiver 12 receives a frame from bus 40, which is converted by transceiver 12 as a receive signal RXD. Stated more precisely, receive message RX is transmitted to central processing unit 131. Receive message RX includes data that another subscriber station 10, 20, 30 of bus system 1 sent via bus 40, in particular in a frame 450 or some other frame, and that were received by the subscriber station, more precisely, its transceiver 12.

Protocol control unit 111 combines the data of transmit message TX with additional control and check bits, which are defined by the communications protocol for the serial transmission on bus 40, as described above with reference to FIG. 2 for frame 450 as an example. The TXD signal produced in this manner, which is also called a transmit frame or frame, uses at least one check sum for a frame for bus 40, which is calculated by communications error detection module 14. The at least one check sum includes frame check sum F_CRC described above with reference to frame 450 and/or the above-described header check sum H_CRC and/or at least one other check sum. The calculation of the at least one check sum may basically be implemented alternatively or additionally in software, which is executed on central processing unit 131 of microcontroller 13. In contrast, protocol control unit 111 extracts from a received RXD signal the control and check bits that are defined by the communications protocol for the serial transmission on bus 40. Protocol control unit 111 forwards the resulting receive message RX to microcontroller 13.

In addition, protocol control unit 111 outputs information about transmit signal TXD to error detection test device 15, more precisely, to its first terminal 1521 and/or second terminal 1522. For instance, such information is a message as to when protocol control unit 111 begins transmitting a frame 450 or some other frame for bus 40 (Send_Start). In addition or as an alternative, such information consists of signaling, with the aid of a pulse or an edge per transmitted bit of transmit signal TXD or frame 450 (bit pulse). Error detection test device 15, on the other hand, signals to protocol control unit 111 by a switching signal S_INV when a bit of transmit signal TXD or frame 450 is to be interrupted (invert bit). The signaling may particularly be realized with the aid of a third terminal 156 of device 15. This will be described in greater detail in the following text.

Error detection test device 15 has at least one configuration register 151, at least one counter 152, an evaluation module 153, a control module 154, a logic module 155, an output terminal 156 and, optionally, an additional output terminal 157.

The value range of the at least one counter 152 should at least be high enough so that the bits of the longest possible frame 450 or some other longest possible frame transmitted via bus 40 are able to be counted. The at least one configuration register 151 should have precisely the same width as the at least one counter 152. Evaluation module 153 checks whether the at least one counter 152 has a predefined counter value. Control module 154 may be embodied as a control logic. With the aid of control module 154, error detection test device 15 is able to be switched on or off.

In addition, evaluation module 153 may have a software which determines, especially calculates, which bit of a predefined transmit signal TXD (the test frame) must be inverted so that the receivers of the interrupted test frame are able to check the function of a predefined and above-described error detection mechanism. However, the software may alternatively or additionally be provided externally from evaluation module 153, e.g., on an external computer (PC). The determination of the at least one bit by the software in the latter example may be realized offline in a software tool (tool) on the PC. Independently thereof, the software prepares a list of check messages with check bit positions. The list is ascertained once by a software and generated as a list of test frames, including error bit positions.

During the ongoing operation, the value determined or calculated by the software is written into the at least one configuration register 151, central processing unit 131 then in particular fetching check messages from the list and writing the associated check bit position into configuration register 151. Depending on the desired error condition or the error mechanism to be checked, a suitable check message is then selected from the list. The check message is forwarded to protocol control unit 111 for the generation of the corresponding frame from the check message. The corresponding error bit position is written into the at least one configuration register 151. In addition, error detection test device 15 is switched on shortly before the transmission start of the test frame or the predefined transmit signal TXD. At the latest with a signal (Send_Start) of control unit 111, the value of the at least one configuration register 151 is able to be written into the at least one counter 152. The signaling with the aid of a pulse or an edge per transmitted bit of transmit signal TXD or frame 450 (bit pulse) causes the at least one counter 152 to be incremented if the counter is an incrementing counter, or the at least one counter 152 to be decremented if the counter is a decrementing counter.

Figure 6:
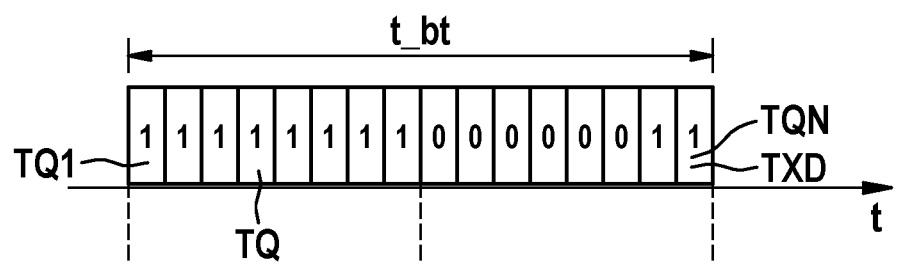
FIG. 6 and FIG. 7 each show a respective time diagram to illustrate a special bit sequence of a transmit signal TXD, in accordance with an example embodiment of the present invention.

Switching signal S_INV, which is able to interrupt a certain bit in the test frame or in predefined transmit signal TXD, is active only for the length of a bit time t_bt, which is shown in each one of FIG. 5 to FIG. 6, for example. If necessary, bit time t_bt may be subdivided into at least two time quanta TQ1 to TQN, as illustrated in FIG. 6, N being any natural number >1.

In the simplest case, the at least one counter 152 from FIG. 3 is loaded with the content of the at least one configuration register 151 at the transmission start of the TXD signal for a frame 450 or some other frame to be transmitted via bus 40. The at least one counter 152 is then decremented once per transmitted bit. When the at least one counter 152 reaches the counter value 0, evaluation module 153 activates switching signal S_INV and forwards switching signal S_INV via logic module 155 and terminal 156 to logic module 112. This inverts the currently transmitted bit of transmit signal TXD. Logic module 155 may be embodied as an AND gate, for instance.

If there is more than one configuration register 151, for example so that multiple bit errors can be impressed per frame or into the predefined transmit signal TXD, the at least one counter 152 is loaded with counter value 0 and then incremented once per transmitted bit of predefined transmit signal TXD. Evaluation module 153 is configured to activate switching signal S_INV for inverting the bit of transmit signal TXD when the at least one counter 152 assumes the value of one of configuration registers 151.

As a result, switching signal S_INV in communications control device 11, optionally in protocol control unit 111, is able to invert the serial data input of the output terminal driver of communications control device 11. The inverting may particularly be implemented with the aid of logic module 112, which is embodied as an EXOR gate, for instance. Error detection test device 15 chronologically activates logic module 112 in such a way that a certain selected bit of the instantaneously transmitted transmit signal TXD from FIG. 6, for example, is inverted for a frame 450 or some other frame. Error detection test device 15 operates in parallel with protocol control unit 111.

Figure 7:
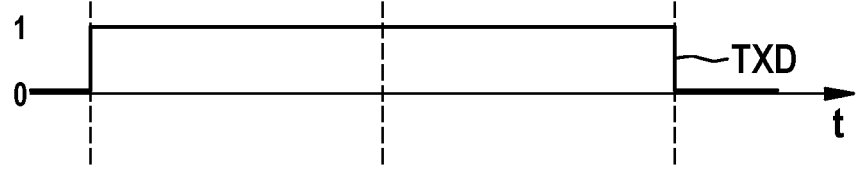

In the example of FIG. 6 or FIG. 7, after the activation of switching signal S_INV as described above, the bit sequence of transmit signal TXD thus no longer reads 010, but 000. Other changes in protocol control unit 111 are not required for testing the error mechanisms of bus system 1.

Logic module 112 thus outputs a modified or interrupted transmit signal TXD1 to transceiver 12.

To minimize the risk of error detection test device 15 inadvertently impressing bit errors, error detection test device 15 is able to switch itself off automatically after error detection test device 15 has interrupted the test frame or the predefined transmit signal TXD by inverting at least one bit, as described above.

The signals from protocol control unit 111 to error detection test device 15 are available in protocol control unit 111 as it is. For that reason, the additional work for the above-described signaling is minimal.

The method described here is particularly suitable for communications protocols in which the bit rate is switched during the transmission of a frame, as in CAN FD or its successor protocol(s), for instance, because the bit boundaries are directly signaled by protocol control unit 111 without the error detection test device 15 having to know the bit rates or the switchover instant between the bit rates. However, the above-described method may also be used in other communication protocols, in particular CAN or Ethernet, or some other serial communications protocol, etc., in which the bit rate is not switched during the transmission of a frame.

The simple communications interface between error detection test device 15 and protocol control unit 111 also makes it possible to offer different versions of the communications interface without any significant modification expense. One version may not have any error detection test device 15 at all. Other versions may differ by the version of error detection test device 15.

One great advantage of the above-described configuration of subscriber station 10 is that protocol control unit 111, which generates or decodes frame 450 or other frames for bus 40, is not able to be expanded by additional functions. Once a state predefined via a configuration has been reached, such functions could invert a bit, predefined via the configuration, of the generated frame. Apart from the greater effort for the verification of control unit 111, such an expansion of protocol control unit 111 would also considerably enlarge the digital circuit of control unit 111, which is disadvantageous. The reason is that this would then also require the consideration of the configuration of the functions of device 15 in every state by control unit 111. This would also increase the risk of undetected design errors of control unit 111. The described configuration of subscriber station 10 with test device 15 makes it possible to avoid these disadvantages.

According to the first modification of the present exemplary embodiment, subscriber station 10 is furthermore developed to apply error detection test device 15 to receive signal RXD1 in addition or as an alternative.

If the function of error detection test device 15 is applied to receive signal RXD1, then subscriber station 10 is able to perform a test locally, i.e., to impress a bit error that is visible only to subscriber station 10. This offers the advantage of increasing the flexibility of the application options. For maximum flexibility, one error detection test device 15 should be used for the TX signal and one error detection test device 15 for the RX signal.

According to a second modification of the present exemplary embodiment, a receive buffer, which stores the messages received from the CAN protocol control unit, is also able or equipped to store messages 45, 46 that protocol control unit 111 has marked as faulty. As a result, an evaluation of a message 45, 46 using software is possible and thus offers greater flexibility in an error treatment.

According to a third modification of the present exemplary embodiment, the interruption (inverting) of the TXD signal alternatively takes place outside protocol control unit 111. In this case, logic module 112 is situated separately from communications control device 11, for example. More particularly, logic module 112 is situated separately between devices 11, 12. As an alternative, logic module 112 is situated in device 12.

According to a fourth modification of the present exemplary embodiment, error detection test device 15 is configured to signal to central processing unit 131 (CPU) that a bit was interrupted. Switching signal S_INV may be provided as an interrupt source for device 131 (CPU) for this purpose, in particular at an optional additional terminal 157 of error detection test device 15. To prevent the signaling of intentional interruptions via an interrupt, the interrupt functions should be deactivated with the activation (enable) of error detection test device 15 until the interruption of the bit in or after the test frame has been carried out. In this way, the function of error detection test device 15 will then be monitored in that an unintended interruption of the transmit signal triggers an interrupt signal.

FIG. 6 and FIG. 7 are helpful also for describing the transmit signal from FIG. 8, which is interrupted by a switching signal from FIG. 9 according to a second exemplary embodiment, as described in the following text.

As mentioned above, a bit time t_bt is able to be subdivided into at least two time quanta TQ, i.e., time quanta TQ1 to TQN, as illustrated in FIG. 6, where N is any natural number >1. In the CAN protocol, a bit is configurable as a whole-number multiple N of a time quantum TQ. A time quantum TQ corresponds to the time resolution based on which protocol control unit 111 is operating.

Error detection test device 15 according to the present exemplary embodiment is therefore able to control not only the interruption (inverting) of whole bits, but also to interrupt (invert) parts of bits. For this reason, the number N of time quanta TQ per bit based on which control unit 111 operates is known also in error detection test device 15. This may be accomplished via a configuration of control module 154 and/or evaluation module 153, for example. Alternatively, the number N of the time quanta TQ per bit is supplied by protocol control unit 111 via a status signal at first terminal 1521. In addition, the information indicating which time quantum or time quanta TQ of the bits is/are to be interrupted (inverted) may be supplied in at least one of configuration registers 151.

Thus, if error detection test device 15 is activated (enabled), then error detection test device 15 waits for the bit to be interrupted and generates within the bit for each time quantum TQ the appropriate switching signal S_INV (invert signal). Optionally, error detection test device 15 is thus able to signal to central processing unit 131 (CPU) that a bit or a time quantum TQ of a bit was interrupted. For this purpose, switching signal S_INV may be provided as an interrupt source for device 131 (CPU), as described above with reference to the preceding exemplary embodiment and its modification.

In the example of FIG. 6, error detection test device 15 includes a register 151, for instance, which configures for every time quantum TQ of the bit whether or not the bit for this time quantum TQ is to be inverted. In the example of FIG. 6 and FIG. 7, the bit having the value 1 is made up of 16 time quanta TQ.

Figure 8:
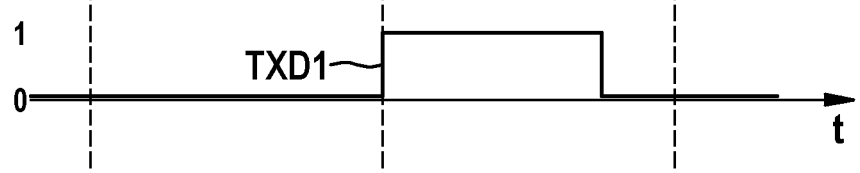
FIG. 8 and FIG. 9 show different transmit signals that are able to be generated from the transmit signal TXD of FIG. 6 and FIG. 7 for a TXD terminal of a subscriber station according to a second exemplary embodiment of the present invention.
Figure 9:
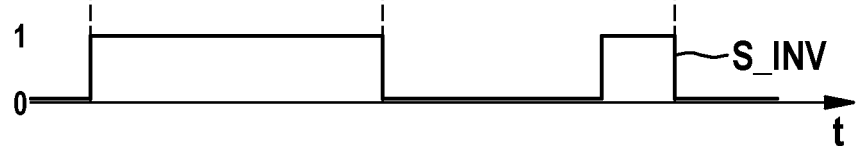

FIG. 8 shows the resulting interrupted transmit signal TXD1 in which all time quanta TQ of FIG. 6 denoted by 1 are inverted in comparison with transmit signal TXD of FIG. 7. FIG. 9 shows switching signal S_INV, which is output at terminal 156 in order to generate interrupted transmit signal TXD1, as described above.

The described embodiment of error detection test device 15 offers the advantage that a bit is able to be falsified in the time resolution of time quanta TQ. This also makes it possible to generate more than only simple bit errors. For example, a (slightly) interrupted physical layer may be emulated, which is interrupted due to wiring or due to characteristics and/or errors of transceiver 12. As a result, the robustness of subscriber station 10 or bus system 1 is able to be tested during an operation.

According to a third exemplary embodiment, a frame ID, i.e., an identifier (ID) such as shown in FIG. 2, is configurable in one of configuration registers 151 and/or in evaluation module 153 of error detection test device 15.

Once the frame ID is configured, error detection test device 15 or evaluation module 153 waits after the activation (enable) of error detection test device 15 until protocol control unit 111 sends a frame 450 or some other frame for bus 40 with the configured frame ID. Only if the frame ID configured in one of configuration registers 151 and/or in evaluation module 153 matches the transmitted frame ID does error detection test device 15 signal by switching signal S_INV that a bit is to be interrupted (inverted). To this end, protocol control unit 111 supplies the frame ID of the frame transmitted just then. This information, that is to say, the frame ID, is available in protocol control unit 111.

If time quanta TQ of the bits are disrupted in different ways, the following applies. If error detection test device is activated (enabled), then error detection test device 15 waits for the frame having the matching ID, then for the bit to be interrupted, and then generates within the bit the matching switching signal S_INV for each time quantum TQ in order to interrupt (invert) at least one time quantum TQ of the bit accordingly.

The embodiment of error detection test device 15 according to the present exemplary embodiment offers two great advantages. The first advantage is that device 131 (CPU) and/or its software need(s) not activate error detection test device 15 immediately before the transmission of the test frame, which lowers the time demands on the software. The second advantage is that it is easily ensured in this way that actually only the test frame is interrupted and not other frames by mistake.

Optionally, a not depicted message processor (message handler), which gives the transmission order to protocol control unit 111, may alternatively or additionally activate error detection test device 15 when the transmission order for the test frame is placed. For example, a control bit in the memory for the test frame to be transmitted is evaluated for this purpose. This memory may be the TX memory.

According to a fourth exemplary embodiment, at least one of configuration registers 151 and/or evaluation module 153 of error detection device 15 is configurable or developed to interrupt bits after the end of a frame. For example, this may be used to provide the bits with interruptions that are transmitted in the minimal inter frame space according to FIG. 2. Inter frame space (IFS) may also be denoted as IFS (inter frame time) or is called intermission in CAN.

As protection against a malfunction, it may be required as a precondition in this particular exemplary embodiment that a bit outside a frame may be interrupted only immediately following a test frame with a predefined frame ID. The predefined frame ID is configurable in at least one of configuration registers 151 and/or in evaluation module 153 of error detection test device 15.

All above-described embodiments of subscriber stations 10, 20, 30 of bus system 1 and the method executed therein may be used individually or in all possible combinations. More particularly, all features of the above-described exemplary embodiments and/or their modifications are able to be combined as desired. The following modifications are possible in addition or as an alternative.

Error detection test device 15, 25, 35 may be provided separately from subscriber station 10, 20, 30, in particular its microcontroller 13.

Even if the present invention has been described above based on the example of the CAN bus system, the present invention may be used in any communications network and/or communications method in which two different communications phases are used in which the bus states differ that are generated for the different communications phases. More specifically, the present invention can be used in developments of other serial communications networks, e.g., Ethernet and/or 100 Base-T1 Ethernet, field bus systems, and more.

In particular, bus system 1 according to the exemplary embodiments may be a communications network in which data are serially transmittable at two different bit rates. It is advantageous but not a mandatory precondition that an exclusive, collision-free access of a subscriber station 10, 20, 30 to a shared channel at least for certain time spans is ensured on bus system 1.

The number and placement of subscriber stations 10, 20, 30 in bus system 1 of the exemplary embodiment is freely selectable. More specifically, subscriber station 20 in bus system 1 may be omitted. It is possible that one or more of subscriber stations 10 or 30 is/are provided in bus system 1. All subscriber stations in bus system 1 may possibly have the same development, that is to say, only subscriber stations 10 or only subscriber stations 30 be provided.

What is claimed is:

1. An error detection test device for a subscriber station of a serial bus system, comprising:
   an evaluation module configured to evaluate which at least one bit in a signal must be interrupted so that receivers of a resulting signal in which the at least one bit is interrupted are able to check a function of a predefined error detection mechanism, the signal being processed by a protocol control unit while the subscriber station is in operation in order to be transmitted as a frame onto a bus of the bus system, or, after a frame has been received from the bus, to decode the signal from the received frame; and
   an output terminal configured to output a switching signal to the protocol control unit to interrupt the at least one bit evaluated by the evaluation module with regard to a signal output by the protocol control unit;
   wherein the evaluation module is configured to generate the switching signal based on the at least one bit evaluated by the evaluation module.

2. The error detection test device as recited in claim 1, further comprising:
   a control module configured to switch on the error detection test device shortly before a start of the signal or to switch off the error detection test device after an end of the signal.

3. The error detection test device as recited in claim 2, wherein the evaluation module and/or the control module is configured to also evaluate an identifier of the frame and/or a control bit with regard to the frame to be transmitted in order to determine whether or not the error detection test device is to be switched on shortly before the start of the signal.

4. The error detection test device as recited in claim 1, further comprising:
   at least one counter configured to count bits of the signal;
   at least one configuration register configured to specify a predefined counter value for the counter after the error detection test device has been switched on;
   at least one input terminal configured to receive information in connection with the signal from the protocol control unit; and
   at least one output terminal configured to signal using the switching signal, when at least a part of a bit in the signal is to be interrupted, the interruption of the signal corresponding to a check sum error and/or a stuff error and/or a format error.

5. The error detection test device as recited in claim 4, wherein the at least one counter is configured to count every bit of the signal based on the information received at the at least one input terminal and to output at the at least one output terminal the switching signal based on the counter value specified by the at least one configuration register.

6. The error detection test device as recited in claim 4, wherein the at least one counter is configured to count every bit of the signal based on the information received at the at least one input terminal, and to output the switching signal at the output terminal when the counter value specified by the configuration register has been reached.

7. The error detection test device as recited in claim 4, wherein the signal is a transmit signal that is to be transmitted in a frame onto the bus, or the signal is a receive signal that is to be received in a frame from the bus, or the signal was generated for an inter frame space between frames on the bus.

8. The error detection test device as recited in claim 1, wherein for a frame that is exchanged between subscriber stations of the bus system, a bit time of a signal transmitted onto the bus in a first communications phase differs from a bit time of a signal transmitted in a second communications phase.

9. The error detection test device as recited in claim 1, wherein the evaluation module is configured to generate the switching signal in such a way that the at least one bit of the signal is inverted.

10. The error detection test device as recited in claim 1, wherein the evaluation module is configured to generate the switching signal in such a way that at least one time quantum of the at least one bit of the signal is inverted, each of the at least one bit being subdivided into at least two time quanta, and the error detection test device is configured so that it is configurable into how many time quanta the at least one bit is subdivided.

11. The error detection test device as recited in claim 1, wherein the frame is compatible with CAN FD.

12. A subscriber station for a serial bus system, comprising:
    at least one error detection test device including:
        an evaluation module configured to evaluate which at least one bit in a signal must be interrupted so that receivers of a resulting signal in which the at least one bit is interrupted are able to check a function of a predefined error detection mechanism, the signal being processed by a protocol control unit while the subscriber station is in operation in order to be transmitted as a frame onto a bus of the bus system, or, after a frame has been received from the bus, to decode the signal from the received frame, and
        an output terminal configured to output a switching signal to the protocol control unit to interrupt the at least one bit evaluated by the evaluation module with regard to a signal output by the protocol control unit,
        wherein the evaluation module is configured to generate the switching signal based on the at least one bit evaluated by the evaluation module;
    a communications control device configured to control a communication of the subscriber station with at least one other subscriber station of the bus system, and the communications control device includes the protocol control unit which is configured to process the signal while the subscriber station is in operation in order to be transmitted as a frame onto a bus of the bus system, or, after a frame has been received from the bus, to decode the signal from the received frame; and
    a transceiver configured to transmit a transmit signal generated by the communications control device as a frame onto the bus and/or to receive a frame from the bus.

13. The subscriber station as recited in claim 12, further comprising:
    a logic module configured to input the signal processed by the protocol control unit and the switching signal, and to output the signal interrupted by the at least one error detection test device, the switching signal being active only for a part of the at least one bit that is to be interrupted;
    wherein the transceiver is configured to store the signal interrupted by the at least one error detection test device to evaluate the signal interrupted by the at least one error detection device.

14. A bus system, comprising:
    a bus; and
    at least two subscriber stations which are connected via the bus in such a way that they are able to serially communicate with one another;
    wherein at least one of the subscriber stations includes:
        at least one error detection test device including:
            an evaluation module configured to evaluate which at least one bit in a signal must be interrupted so that receivers of a resulting signal in which the at least one bit is interrupted are able to check a function of a predefined error detection mechanism, the signal being processed by a protocol control unit while the subscriber station is in operation in order to be transmitted as a frame onto the bus, or, after a frame has been received from the bus, to decode the signal from the received frame, and
            an output terminal configured to output a switching signal to the protocol control unit to interrupt the at least one bit evaluated by the evaluation module with regard to a signal output by the protocol control unit,
            wherein the evaluation module is configured to generate the switching signal based on the at least one bit evaluated by the evaluation module;
        a communications control device configured to control a communication of the subscriber station with at least one other subscriber station of the bus system, and the communications control device includes the protocol control unit which is configured to process the signal while the subscriber station is in operation in order to be transmitted as a frame onto a bus of the bus system, or, after a frame has been received from the bus, to decode the signal from the received frame; and
        a transceiver configured to transmit a transmit signal generated by the communications control device as a frame onto the bus and/or to receive a frame from the bus.

15. A method for testing mechanisms for detecting errors in a communication in a serial bus system, the method being executed by an error detection test device for a subscriber station of the bus system, and the method comprising the following steps,
    evaluating, using an evaluation module of the error detection test device, which at least one bit in a signal must be interrupted so that receivers of a resulting signal in which the at least one bit is interrupted are able to check a function of a predefined error detection mechanism, the signal being processed by a protocol control unit of the subscriber station while the subscriber station is in operation in order to be transmitted as a frame onto a bus of the bus system, or, after a frame has been received from the bus, to decode the signal from the received frame; and outputting, using an output terminal, a switching signal to the protocol control unit to interrupt the at least one bit, evaluated by the evaluation module, in the signal output by the protocol control unit, the evaluation module generating the switching signal based on the at least one bit evaluated by the evaluation module.

\* \* \* \* \*